United States Patent [19]
Yasui

[11] Patent Number: 6,086,766
[45] Date of Patent: Jul. 11, 2000

[54] PROCESS AND APPARATUS FOR BIOLOGICAL TREATMENT OF AQUEOUS ORGANIC WASTES

[75] Inventor: Hidenari Yasui, Atsugi, Japan

[73] Assignee: Kurita Water Industries Ltd., Tokyo, Japan

[21] Appl. No.: 09/043,313

[22] PCT Filed: Jul. 19, 1996

[86] PCT No.: PCT/JP96/02025

§ 371 Date: Mar. 13, 1998

§ 102(e) Date: Mar. 13, 1998

[87] PCT Pub. No.: WO98/03437

PCT Pub. Date: Jan. 29, 1998

[51] Int. Cl.[7] .................................................. C02F 3/12
[52] U.S. Cl. .................. 210/625; 210/631; 210/760; 210/192; 210/195.3; 210/220
[58] Field of Search .................................... 210/609, 620, 210/623, 625, 626, 760, 631, 192, 194, 193.1, 195.3, 202, 220

[56] References Cited

U.S. PATENT DOCUMENTS

| | | | |
|---|---|---|---|
| 4,488,968 | 12/1984 | Hong et al. | 210/625 |
| 5,116,574 | 5/1992 | Pearson | 210/760 |
| 5,151,187 | 9/1992 | Behmann | 210/195.3 |
| 5,173,257 | 12/1992 | Pearson | 210/760 |
| 5,397,480 | 3/1995 | Dickerson | 210/760 |
| 5,492,624 | 2/1996 | Rozich | 210/625 |
| 5,785,874 | 7/1998 | Teran et al. | 210/192 |

FOREIGN PATENT DOCUMENTS

| | | |
|---|---|---|
| 7-96297 | 4/1995 | Japan . |
| 8-19789 | 1/1996 | Japan . |
| 8-132100 | 5/1996 | Japan . |

*Primary Examiner*—Christopher Opton
*Attorney, Agent, or Firm*—Flynn, Thiel, Boutell & Tanis, P.C.

[57] ABSTRACT

A process for reducing the amount of excess sludge by aerobically treating an aqueous organic waste in an aeration tank in the presence of a biosludge containing aerobic microorganisms, subjecting the resulting mixed liquor to a solid/liquid separation, the so-separated liquid phase being discharged as treated liquor, and supplying at least a part of the separated biosludge, after having been treated with ozone, to the aeration tank, wherein the ozone treatment is realized by passing a mixed flow of a biosludge-containing liquor to be treated or a liquor containing the ozonized biosludge and of an ozone-containing gas through a flow-down pipe in a downward flow and introducing the flow into an ozone-treating vessel in a state in which the ozone-containing gas is dispersed as finely disintegrated bubbles, whereby the clogging of a gas diffuser due to the adhesion of the biosludge is avoided and ozone treatment is attained at a high ozone yield.

8 Claims, 3 Drawing Sheets

Gas/Liquor Flow Rate Ratio in Flow-down Pipe

Gas Linear Velocity in Flow-down Pipe (m/sec)

PROCESS AND APPARATUS FOR BIOLOGICAL TREATMENT OF AQUEOUS ORGANIC WASTES

FIELD OF THE INVENTION

The present invention relates to a process and an apparatus for biological treatment of aqueous organic wastes in which the wastes are treated in the presence of a biosludge containing living aerobic microorganisms. In particular, the present invention relates to a process and an apparatus, in which the amount of excess sludge in the aerobic biological treatment system can be reduced.

BACKGROUND OF THE INVENTION

An aerobic biological treatment of aqueous organic wastes by treating them under an aerobic condition by making use of the actions of aerobic microorganisms, as in a biosludge treatment, permits a low cost treatment with a superior treatment performance and has found a wide use in general. It suffers, however, from a problem of the occurrence of a large amount of "excess sludge", which is difficult to dewater. This excess sludge may amount to about 30–60% by weight of the reduced BOD and the disposal thereof is difficult. Heretofore, the excess sludge has been disposed of by depositing it in a landfill. It has recently become more and more difficult to reserve such a landfill site and, thus, a reduction of the amount of excess sludge is required.

A process has been proposed for reducing the amount of excess sludge in an aerobic biological treatment of an aqueous organic waste by subjecting the biosludge formed therein to an ozone treatment and returning the resulting treated sludge to the aerobic biological treatment step (for example, Japanese Patent Kokai No. 206088/1994 and corresponding EPO 0645347 A1). This prior technique can reduce the amount of the biosludge formed during the aerobic biological treatment by subjecting the biosludge to an ozone treatment to convert it into an easily biodegradable product to be metabolized by aerobic microorganisms as a BOD source, whereby it may eventually be attainable to reduce the amount of formed excess sludge to zero.

In such a treating technique, the ozone treatment is realized by blowing an ozone-containing gas into a biosludge-containing liquor to cause the ozone to contact with the biosludge. When an ozone-containing gas is blown into a biosludge-containing liquor, the liquor becomes viscous and easily foamable due to the oxidative degradation of the biosludge, whereby the entire biosludge-containing liquor in the ozone-treating vessel will become filled with a foam layer of a consistency similar to shaving cream. Even if the ozone-containing gas is further blown thereinto in this state, it is difficult to increase the gas/liquid contacting efficiency by a further fine disintegration of bubbles and, thus, any higher ozone absorption rate may not be attained.

Therefore, it is necessary, for attaining a high ozone absorption rate, to further disintegrate the bubbles of the ozone-containing gas, wherefor a technique of blowing an ozone-containing gas into the biosludge-containing liquor through a porous gas diffuser plate may be employed. Here, however, bacteria having a high resistivity against ozone are apt to grow due to the conversion of the biosludge into an easily biodegradable product, despite the ozone exhibiting a bactericidal action. This will bring about the adhesion of a biofilm onto the diffuser plate to cause the blockage thereof, so that the introduction of the ozone-containing gas therethrough may not be allowed to be maintained for a long period of time.

An object of the present invention is to provide a process and an apparatus for a biological treatment of aqueous organic wastes, which enables the ozone absorption rate to be maintained at a higher value and to realize an uninterrupted long-lasting introduction of the ozone-containing gas by introducing the ozone-containing gas so as to form finely disintegrated bubbles without suffering from blockage of the gas blow-in element, even when a thick foam layer is built up within the entire ozone-treating vessel due to the formation of a viscous and easily foamable biosludge suspension by the ozone treatment, whereby an efficient ozone treatment can be realized while reducing the amount of excess sludge.

DISCLOSURE OF THE INVENTION

The process for the biological treatment of aqueous organic wastes according to the present invention is based on an aerobic treatment of the aqueous organic waste in an aeration tank in the presence of a biosludge containing aerobic microorganisms, which comprises a step of aerobic biological treatment realized by subjecting the aqueous organic waste supplied to the aeration tank to aerobic biological treatment in the presence of a biosludge containing aerobic microorganisms, a step of solid/liquid separation realized by subjecting the mixed liquor in the aeration tank to solid/liquid separation, the so-separated liquid phase being discharged as treated liquor, a step of ozone treatment realized by treating a biosludge-containing liquor, which is formed from a part of either the mixed liquor withdrawn from the aeration tank or the separated biosludge from the solid/liquid separation, with ozone and a step of supplying a liquor which contains the ozonized biosludge to the aeration tank, wherein the step of ozone treatment comprises passing a mixed flow of the biosludge-containing liquor to be treated or the ozonized biosludge-containing liquor and the ozone-containing gas through a flow-down pipe in a downward flow and introduced the flow into an ozone-treating vessel in a state in which the ozone-containing gas is dispersed as finely disintegrated bubbles within the biosludge-containing liquor, so as to cause the biosludge-containing liquor to contact with the ozone-containing gas.

The apparatus for biological treatment of aqueous organic wastes according to the present invention comprises an aeration tank in which aerobic treatment of the aqueous organic waste introduced thereinto is realized in the presence of a biosludge containing aerobic microorganisms, a solid/liquid separation means for subjecting the mixed liquor in the aeration tank to solid/liquid separation and discharging the so-separated liquid phase as treated liquor, an ozone-treating vessel in which a biosludge-containing liquor formed from a part of either the mixed liquor withdrawn from the aeration tank or of the separated biosludge from the solid/liquid separation is contacted with an ozone-containing gas to effect an ozone treatment and a supply line for supplying a liquor which contains the ozonized sludge in the ozone-treating vessel to the aeration tank, wherein the ozone-treating vessel is provided with a flow-down pipe for passing a mixed flow of the biosludge-containing liquor to be treated or the ozonized biosludge-containing liquor and of the ozone-containing gas therethrough in a downward flow, so as to cause the ozone-containing gas to be dispersed as finely disintegrated gas bubbles within the biosludge-containing liquor.

The aqueous organic wastes to be treated according to the present invention are aqueous wastes which contain organic substances capable of being treated by commonly employed aerobic biological treatment techniques and which may contain also some other difficultly biodegradable organic substances and even inorganic substances. Examples of such aqueous organic wastes include sewage water, excrement, waste liquors from food and drink manufacturing factories and various industrial aqueous wastes.

According to the present invention, aqueous organic wastes are subjected to an aerobic biological treatment in the presence of a biosludge containing aerobic microorganisms. For such a treatment, while standard techniques for aerobic biological treatment with an activated sludge, which comprise the steps of bringing the aqueous organic waste into contact with the activated sludge in an aeration tank under aeration, subjecting the resulting aqueous suspension to a solid/liquid separation in a solid/liquid separation unit and returning a part of the so-separated biosludge to the aeration tank, may be employed in general, other techniques on modifications of these standard techniques may also be employed.

According to the present invention, a part of the biosludge is withdrawn from the treating system for the aerobic biological treatment and the withdrawn biosludge is subjected to an ozone treatment. While it is preferable in effecting the biosludge withdrawal to withdraw a part of the biosludge separated in the solid/liquid separation unit, it may be permissible to withdraw the biosludge in the form of a mixed liquor from the aeration tank. When withdrawing from the separated biosludge, a part or the whole of the biosludge exhausted as excess sludge may be withdrawn. It is more preferable, however, that a part of the biosludge to be returned to the aeration tank as return sludge is further withdrawn, in addition to the excess sludge, to be subjected to the ozone treatment. In this case, the amount of excess sludge can further be reduced and may even reach zero according to some conditions.

The ozone treatment may be effected in an acidic condition in a pH range below 5. Here, the pH control may be attained preferably by adding an inorganic acid, such as sulfuric acid, hydrochloric acid or nitric acid, as a pH controlling agent, to the biosludge or by acidogenesis of the biosludge or, further, by a combination of them. When using the addition of the pH controlling agent, it is preferable to adjust the pH value to 3–4. When acidogenesis is employed, a pH of 4–5 may preferably be attained.

The ozone treatment can be carried out by causing the extracted sludge or the resulting suspension from the acidogenesis as such or, if necessary, after it has been concentrated by, for example, a centrifuge, to be contacted with ozone at a pH of 5 or lower. As the ozone source, not only ozonized oxygen gas, but also ozonized air, may be employed. The amount of ozone to be introduced may preferably be adjusted at a value of 0.002–0.05 gram of $O_3$ per one gram of VSS, preferably 0.005–0.03 gram of $O_3$ per one gram of VSS. This amount of ozone to be introduced corresponds to the amount of ozone absorbed by the sludge-containing gas. By the ozone treatment, the biosludge is subjected to an oxidative biodegradation and is converted into BOD components.

According to the present invention, a technique is adopted in which a flow-down pipe is employed for effecting the contact with ozone. Thus, an ozone-containing gas is introduced into the ozone-treating vessel in a state of finely disintegrated bubbles dispersed within the biosludge-containing liquor by passing a mixed flow of the biosludge-containing liquor to be treated or the ozonized sludge-containing liquor and of the ozone-containing gas through the down-flow pipe in a downward flow. By dispersing the ozone-containing gas in the form of finely disintegrated bubbles, the gas/liquid contacting efficiency increases and the ozone absorption yield increases.

In the biosludge-containing liquor introduced into the vessel in the state of dispersion of the ozone-containing gas, the ozone-containing gas will gather at the upper part and the liquor will gather at the bottom. By this, basically, a foam layer rich in the gas components is formed at the upper part and a liquid layer containing gas bubbles is formed at the lower part.

The height of the liquid layer may favorably amount to 0.2–3 meters, preferably 0.5–1.5 meters. While a height of the liquid layer of at least 1 meter may be enough, a height of 1–10 m, more preferably 2–5 m may be desirable.

The liquid layer is rich in liquid but contains gas bubbles and has, as a whole, an appearance similar to a shaving cream constituted of a foam layer, so that the boundary between both layers may at some times be uncertain. Here, it is necessary to blow the ozone-containing gas into the vessel in a state in which the gas is preliminarily finely disintegrated, since the gas bubbles may not be dispersed by simply blowing the gas thereinto. When, accordingly, the gas introduction is effected through a porous diffuser plate, clogging of the pores will occur so that a continuous operation for a long period of time will be difficult.

In the ozonized biosludge-containing liquor in the liquid layer formed at the lower part, the requisite absorption of ozone is effected by mixing the liquor with the ozone-containing gas repeatedly and introducing the mixture through the flow-down pipe in a downward flow. Here, the liquor may be circulated either to the flow-down pipe of one and the same ozone-treating vessel or to the flow-down pipe of a subdivided ozone-treating vessel in a posterior stage of a multistaged ozone-treating unit.

The longer the flow-down pipe is, the more preferable it will be. However, the length may usually be 1–20 m, preferably 2–10 m. In the case of a short length, the ozone absorption rate can be increased by circulating either the liquor or the gas or passing it through a multistaged unit. The flow rate proportion of gas/liquor in the flow-down pipe may generally be 0.1–1, preferably 0.2–0.5. The ozone absorption rate becomes high by adjusting the linear velocity (LV) of the gas in the flow-down pipe, in general, at 0.4–4 m/sec, preferably 0.6–1 m/sec. These values apply regardless of the pressure. However, the amount of ozone absorbed in the liquor will be greater, as the pressure increases, since the gas volume thereby decreases. The gas pressure may usually be chosen in the range from normal pressure to 10 $kgf/cm^2$ gauge. In order to realize the above-mentioned introduction rate of ozone under such a condition, it is preferable to adjust the space velocity (SV) of the gas in the ozone-treating vessel at a value of 3–5 $hr^{-1}$.

By the ozone treatment, the biosludge is subjected to an oxidative decomposition by the reaction with ozone and is converted into easily biodegradable products as BOD components, which are supplied to the aeration tank to be subjected to a biological treatment. The exhaust gas discharged from the ozone-treating vessel is introduced into the aeration tank together with the aeration air, after having been deprived of ozone by an exhaust gas treatment, if necessary, to be used for aeration to thereby cause the residual ozone to be absorbed by the biosludge present in the aeration tank, before being discharged out to the atmospheric air.

By performing the aerobic biological treatment of the ozonized sludge by introducing it into the aeration tank in the aerobic biological treatment step, the easily biodegradable products which have been converted into BOD components by the ozone treatment are easily removed under biodegradation. By this, a high treated water quality is attained with the simultaneous reduction in the amount of the sludge discharged out of the system.

Here, the greater the amount of the sludge subjected to the ozone treatment, the higher will be the reduction rate of the amount of sludge. However, zero excess sludge cannot be attained simply by the ozone treatment of excess sludge, since the biosludge proliferates upon the biodegradation of organic matters contained in the ozone-treated sludge. When, nevertheless, the ozone treatment is effected while withdrawing the surplus biosludge so as to reduce the amount of proliferated biosludge to be apparently zero, the amount of excess sludge occurring from the system can be reduced to zero. Since the biological mineralization rate of the ozone-treated biosludge amounts to 30–35% by weight, 65–70% by weight of the excess sludge continues to proliferate. Therefore, the amount of formation and the amount of mineralization of the biosludge will become balanced so as to realize zero amount of excess sludge, when 2.5–3.5 times, preferably 2.8–3.4 times the amount of the formed excess sludge, namely, the increased amount of biosludge without incorporation of ozone treatment, are withdrawn and subjected to ozone treatment.

Here, the biological treatment performance may occasionally decrease, as the amount of the biosludge subjected to the ozone treatment increases. However, no decrease in the biological treatment performance may be found, so long as the amount of the biosludge to be subjected to ozone treatment is not higher than 30% by weight per day, with respect to the amount of the sludge present in the biological treatment tank. Even when the biological treatment performance decreases, this performance can be kept at a high value, by maintaining a constant amount of the biosludge by arranging in the aeration tank a carrier means for carrying the biosludge.

In the aerobic biological treatment step, a reduction of the amount of excess sludge can be attained while excluding any decrease in the performance of the biological treatment with the simultaneous improvement of the sedimentation property and dewaterability of the biosludge in the aeration tank, by controlling the amount of sludge to be supplied to the ozone treatment and the amount of excess sludge exhausted out of the system so as to maintain the VSS/SS ratio and the MLVSS value in the aeration tank at each predetermined value. By this, the operation of the solid/liquid separation unit is made easy and the dewatering of the formed excess sludge can be effected easily.

Thus, the sedimentation property and the dewatering performance can be improved by controlling the operation in such a manner that the VSS/SS ratio of the biosludge in the aeration tank is maintained at 0.2–0.7, preferably 0.3–0.6 and the MLVSS is maintained at 500–10,000 mg/l, preferably 1,000–5,000 mg/l. As a general trend, the lower the VSS/SS ratio, the higher the density of the biosludge will be, whereby the sedimentation property and the dewatering performance are improved.

THE BEST MODE FOR REALIZING THE INVENTION

Figure 1:
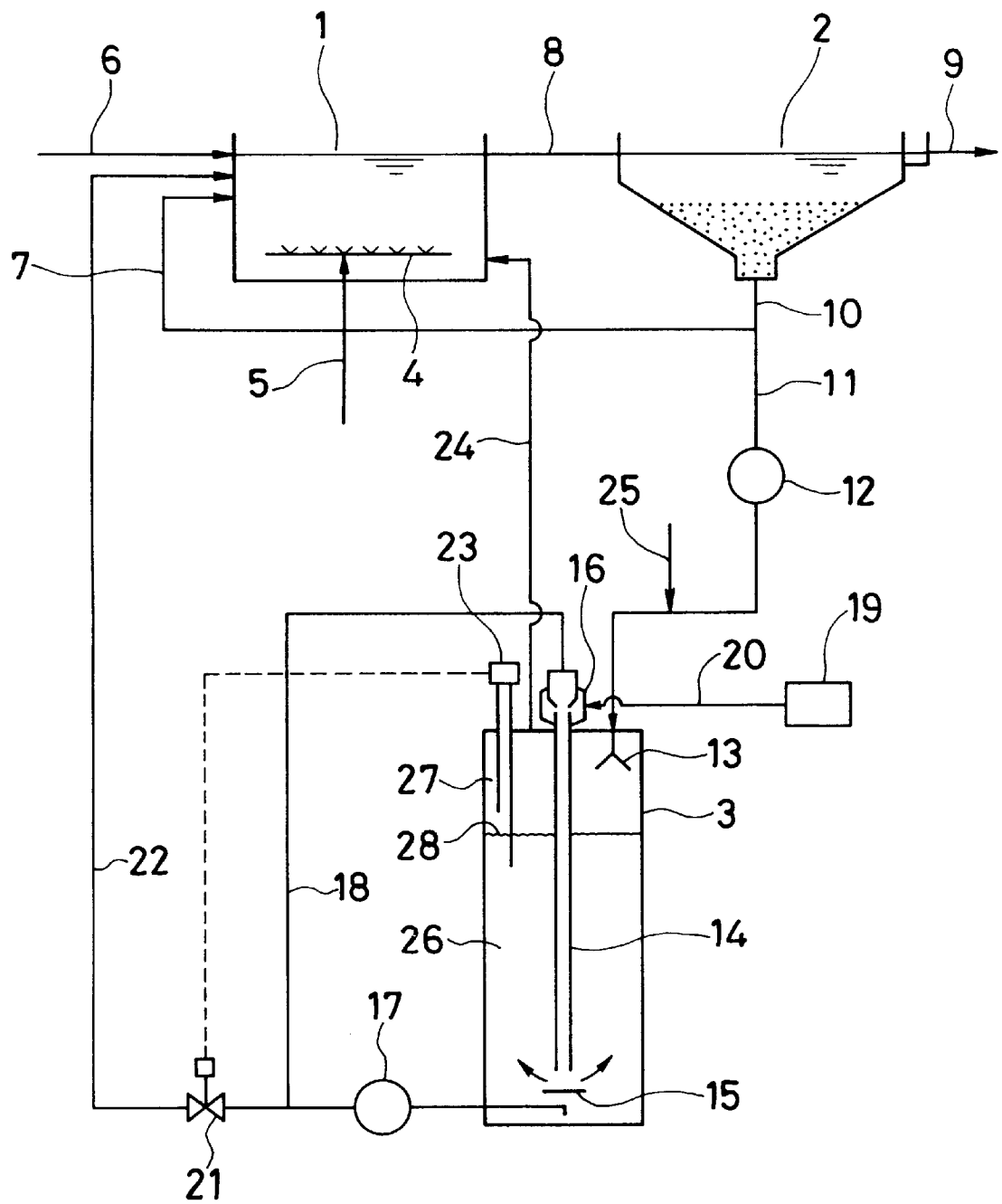
FIG. 1 is a schematic flow diagram showing an embodiment of the treatment apparatus.
Figure 2:
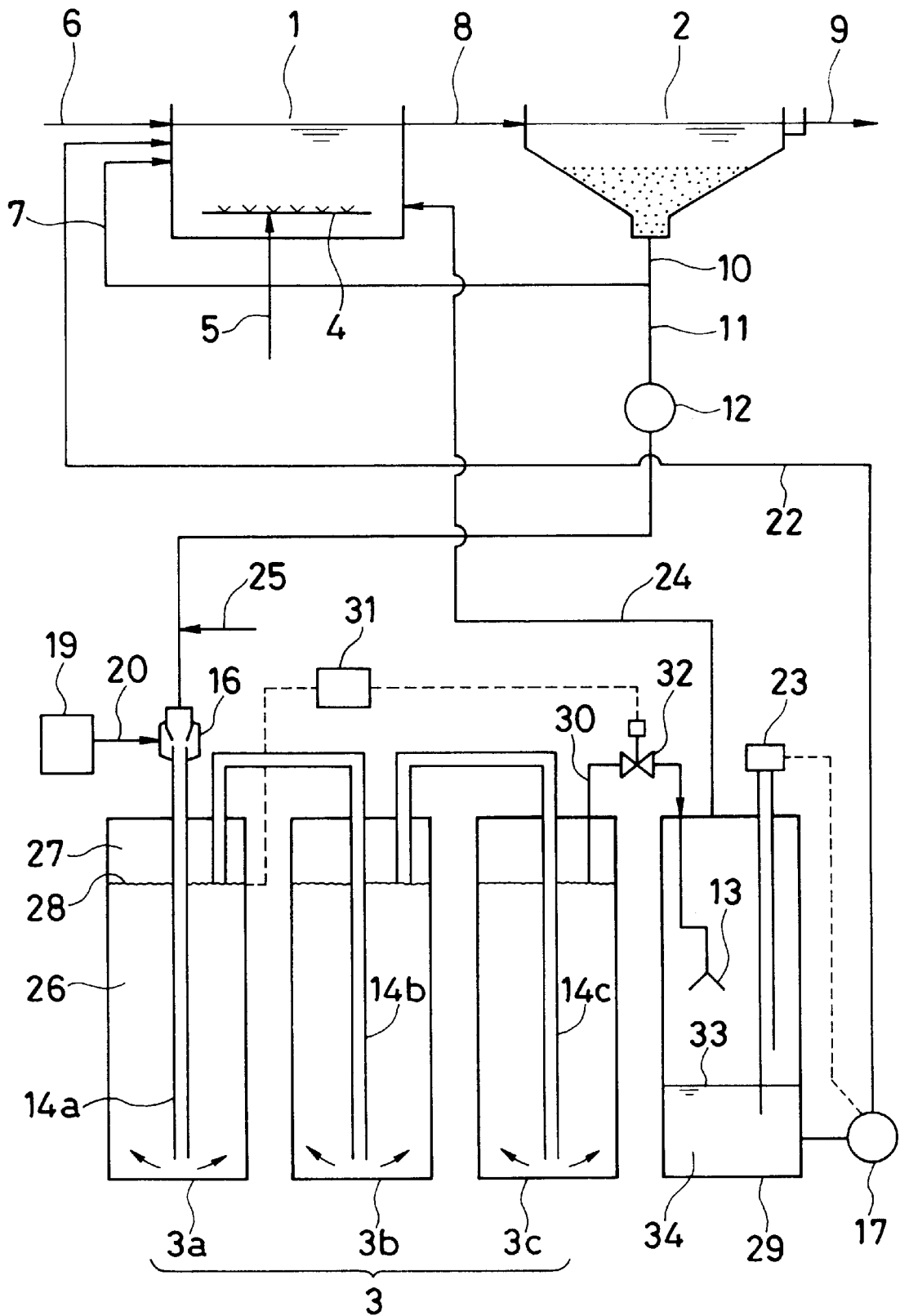
FIG. 2 is a schematic flow diagram of another embodiment of the treatment apparatus.

FIGS. 1 and 2 each show a preferred embodiment of the treatment apparatus according to the present invention. In FIG. 1, symbols 1, 2 and 3 represent an aeration tank, a solid/liquid separation vessel and an ozone-treating vessel, respectively. In the aeration tank 1, a gas distributor 4 is arranged to which air is supplied via an air supply line 5. A waste supply line 6 and an activated sludge return line 7 communicate with the aeration tank 1, which is connected to the solid/liquid separation vessel 2 by a connection line 8. The solid/liquid separation vessel is connected at its upper portion with a treated water line 9 and at its bottom with a sludge discharge line 10 branching away to the activated sludge return line 7 and to a biosludge withdrawal line 11.

The biosludge withdrawal line 11 communicates via a pump 12 to a spray means 13 disposed at an upper portion of the ozone-treating vessel 3. The ozone-treating vessel 3 is provided with a vertically directed flow-down pipe 14, at the opening end of which is arranged a bumper plate 15. An ejector 16 is arranged above the flow-down pipe 14, to which a circulation line 18 with a pump 17 communicates. The ejector 16 is connected with an ozone supply line 20 guided from an ozone generator 19. An ozonized biosludge supply line 22 having a valve 21 branches from the circulation line 18 to the aeration tank 1. 23 is an electrode liquid level indicator which controls the degree of opening of the valve 21. An exhaust gas line 24 is guided from the top of the ozone-treating vessel 3 and opens into the aeration tank 1. 25 is an acid injection line.

An aqueous organic waste is treated by this apparatus in such a manner that the aqueous organic waste is guided from the waste supply line 6 into the aeration tank 1 where it is mixed with the activated sludge returned via the sludge return line 7 while also introducing air thereinto to effect aeration of the resulting mixed liquor, in order to realize an aerobic biotreatment by making use of the biological activity of aerobic microorganisms in the activated sludge. The mixed liquor within the aeration tank 1 is guided into the solid/liquid separation vessel 2 via the connection line 8 to subject it to solid/liquid separation, whereupon the so-separated liquid is drawn out as the treated water via the treated water line 9. The biosludge separated therein is taken out via the sludge discharge line 10, a part of which is returned to the aeration tank 1 via the return line 7. The remainder of the separated biosludge is guided via the biosludge withdrawal line 11 by the pump 12 into the ozone-treating vessel 3 as a biosludge slurry to be ozonized. At this occasion, an acid is introduced into the unit via the acid injection line 25.

In the ozone-treating vessel 3, a contacting zone 26 is built up which is composed of a relatively liquid-rich liquid layer and a relatively liquid-lean foam layer thereon. Above the ozone contact zone 26 is formed a gas space 27. The biosludge slurry to be ozonized is circulated by drawing out the slurry from the bottom of the contacting zone 26 through the circulation line 18 by the pump 17, whereby a mixed flow is formed in the flow-down pipe 14 under aspiration of the ozone-containing gas supplied from the ozone generator 19 by the ejector 16 and is guided in the flow-down pipe 14 in a downward flow. Due to the reverse action of the floating force of the gas against the down flow of the mixed liquor in the flow-down pipe 14, a vortex flow is produced, whereby the ozone-containing gas is dispersed within the biosludge slurry as finely disintegrated gas bubbles.

Due to the fine dispersion of the minute bubbles of the ozone-containing gas in the biosludge slurry, the gas/liquid contact area becomes large. The mixed flow discharging out of the flow-down pipe 14 into the contacting zone 26 rushes onto the bumper plate 15 and diverges over the entire area of the ozone absorbing vessel. It flows up the contacting zone 26 while maintaining the state of gas/liquid contact and passes through the foam layer where a thin film contact prevails, whereby the gas/liquid contact efficiency is increased and the ozone absorption rate becomes high. Since the diameter of the flow-down pipe 14 is far greater than the pore size of the perforated plate, there is no fear of clogging due to the adhesion of the biosludge. By spraying the biosludge slurry guided from the biosludge withdrawal line 11 to the ozone-treating vessel 3 onto the foam layer from the spray means 13, formation of foam is suppressed.

A part of the ozonized biosludge in the circulation line 18 is supplied to the aeration tank 1 through the supply line 22 to be subjected to a biolysis by the activated sludge as a BOD source. Here, the degree of opening of the valve 21 is adjusted by means of the liquid level indicator 23 so as to maintain a constant level of the interface 28 between the contacting zone 26 and the gas space 27. The exhaust gas from the ozone-treating vessel 3 is guided from the top thereof via the exhaust gas line 24 to the aeration tank 1 to effect spent ozone treatment. In order to facilitate absorption of the spent ozone gas by the mixed liquor in the aeration tank 1, a large-sized flow-down pipe 14 was employed, which is not shown in the drawings. If sufficient absorption of the remaining ozone in the spent ozone gas is not able to be attained due to an excessively high concentration of ozone therein, it is preferable to install an apparatus for effecting a preliminary ozone removal using, such as, an activated carbon, a catalyst or the like, midway in the exhaust gas line 24.

By maintaining the ratio of gas/liquid flow rates and the gas linear velocity in the flow-down pipe 14 within the above-mentioned ranges, respectively, the ozone absorption rate can be increased, wherein the rate of recirculation of the biosludge slurry and the residence time of the biosludge required for the ozone dose therefor can be determined. While the ozone treatment can be effected under normal pressure, preference is given for carrying out the ozone treatment under a pressurized condition, since the ozone absorption rate becomes higher and the recirculation rate and the residence time can be reduced.

While the biosludge slurry to be ozonized is sprayed for destroying the foam layer in the embodiment of FIG. 1, it is permissible to supply the biosludge slurry to the flow-down pipe together with the circulated biosludge while employing a separate foam destroying means. A pump exclusively used for guiding the ozonized biosludge may be installed and may be controlled by means of the liquid level indicator. The introduction of the ozone-containing gas into the biosludge slurry may be effected by making use of the gas pressure by the ozone generator, instead of using the ejector.

In the embodiment of FIG. 2, the ozone-treating vessel 3 is composed of three treating chambers 3a, 3b and 3c, each provided with a flow-down pipe 14a, 14b or 14c, respectively. Above the flow-down pipe 14a of the first treating chamber 3a, an ejector 16 is arranged, to which the sludge withdrawal line 11 and the ozone supply line 20 communicate. The upper end of the flow-down pipes 14b and 14c of the subsequent treating chambers 3b and 3c is connected to the top of the respective preceding chamber 3a or 3b so as to open thereinto at a portion near the interface. Subsequent to the final treating chamber 3c, a foam destroying vessel 29 is arranged, which is provided with a spray means 13 connected with a connection line 30 guided from the treating chamber 3c at a portion near the interface. From a lower portion of the foam destroying vessel 29, an ozonized biosludge supply line 22 having a pump 17 communicates with the aeration tank 1 to which also a spent exhaust gas line 24 is guided from the top of the foam destroying vessel 29. 31 is a regulator for controlling the level of the interface 28 between the contacting zone 26 and the gas space 27 in the treating chamber 3a and regulates the valve 32 of the connection line 30. The control of the pump 17 is effected by means of the liquid level indicator 23.

In the above-described apparatus, ozone absorption is effected by introducing the ozone-containing gas into the first stage treating chamber 3a through the flow-down pipe 14a of the first stage of the ozone-treating vessel 3 under dispersion, while mixing, by means of the ejector 16, the ozone-containing gas with the biosludge slurry from the biosludge withdrawal line 11 under pressurization by the pump 12. The mixed flows coming out of the flow-down pipes 14a, 14b and 14c rush onto the bottom walls of the treating chambers 3a, 3b and 3c and flow up then while being dispersed within the entire masses, whereby each contacting zone 26 constituted of a relatively liquid-rich liquid layer containing bubbles and of, above this, a liquid-lean foam layer is formed, the gas/liquid contact being attained in this foam layer. From near the interface 28, the biosludge slurry and the ozone-containing gas flow into the flow-down pipe 14b or 14c of the subsequent stage in the form of a mixed flow, which is then guided as such in a downward flow into the treating chamber of the subsequent stage while causing the ozone-containing gas to be dispersed. In this manner, the gas/liquid contact is realized in a plug flow.

The mixed flow of the biosludge slurry and the ozone-containing gas flows from a portion near the interface of the treating chamber 3c, passing through the connection line 30, into the foam destroying vessel 29, while being sprayed through the spray means 13 to effect the destruction of the foam. The degree of opening of the valve 32 in the connection line 30 is controlled by a control device 31 so as to maintain a constant pressure within the first stage treating chamber 3a. The ozonized liquor 34 separated in the foam destroying vessel 29 is fed to the aeration tank 1 by the pump 17 via the supply line 22, while being controlled by the liquid level indicator 23 so as to maintain a constant liquid level 33. The ozonizing exhaust gas separated in the foam destroying vessel 29 is introduced via the exhaust gas line 24 into the aeration tank 1, wherein the spent ozone is absorbed by a mixed liquor in a flow-down pipe which is not shown in the drawing.

The apparatus of FIG. 2 is so constructed that the gas/liquid mixed flow is boosted by the pump 12, in order to pass it into the multistaged treating chambers 3a, 3b and 3c in a plug flow, wherein the ozone absorption rate is increased due to the compression.

While the apparatuses of FIGS. 1 and 2 incorporate a solid/liquid separation vessel 2 as the solid/liquid separating means, it is permissible to incorporate other separating means, such as an immersed permeable membrane module or the like, in the aeration tank 1. When a permeable membrane module is employed, the treated water is taken out of the membrane module and the returning of the separated biosludge is effected on the surface of the membrane module, while realizing the withdrawal of biosludge for the ozone treatment by withdrawing the mixed liquor from the aeration tank in order to subject it to the ozone treatment.

EXAMPLE 1

Waste water from a medicinal production firm was subjected to an aerobic treatment using the apparatus shown in FIG. 1 at a waste discharge rate of 240 m$^3$/day with a BOD level of 2,200 mg/l and a CODcr of 3,500 mg/l, at a BOD load of 530 kg/day. The aeration tank 1 had a capacity of 1,900 m$^3$, in which the waste was aerated at an MLSS of 4,000–5,000 mg/l, whereby a treated water having a BOD of not higher than 10 mg/l and an SS value of 5–30 mg was obtained. The ozone-treating vessel 3 had a diameter of 1,000 mm and a height of 5,400 mm with an effective volume of 3 m$^3$. The ozone treatment was carried out at a biosludge slurry concentration of 9,000 mg/l, a biosludge slurry flow rate of 1.5 m$^3$/hr, an ozone-containing gas content of 25 g/m$^3$, an ozone-containing gas flow rate of 12 m$^3$/hr (with an SV of 4 hr$^{-1}$), a water circulation rate of 60 m$^3$/hr and a pH of 3 adjusted by the addition of sulfuric acid under normal pressure, whereby a stabilized ozone absorption rate was reached at 90–95% {calculated by [([O$_3$] in the supplied ozone-containing gas)—([O$_3$] in the exhaust gas)× 100] /([O$_3$] in the supplied ozone-containing gas)}. The amount of the excess sludge generated without ozone treatment amounted to 200 kg DS/day, which was reduced to zero by the ozone treatment. There occurred no clogging of the ozone-treating vessel 3, the flow-down pipe 14 and the circulation line 18 due to adhesion of the sludge.

Figure 3:
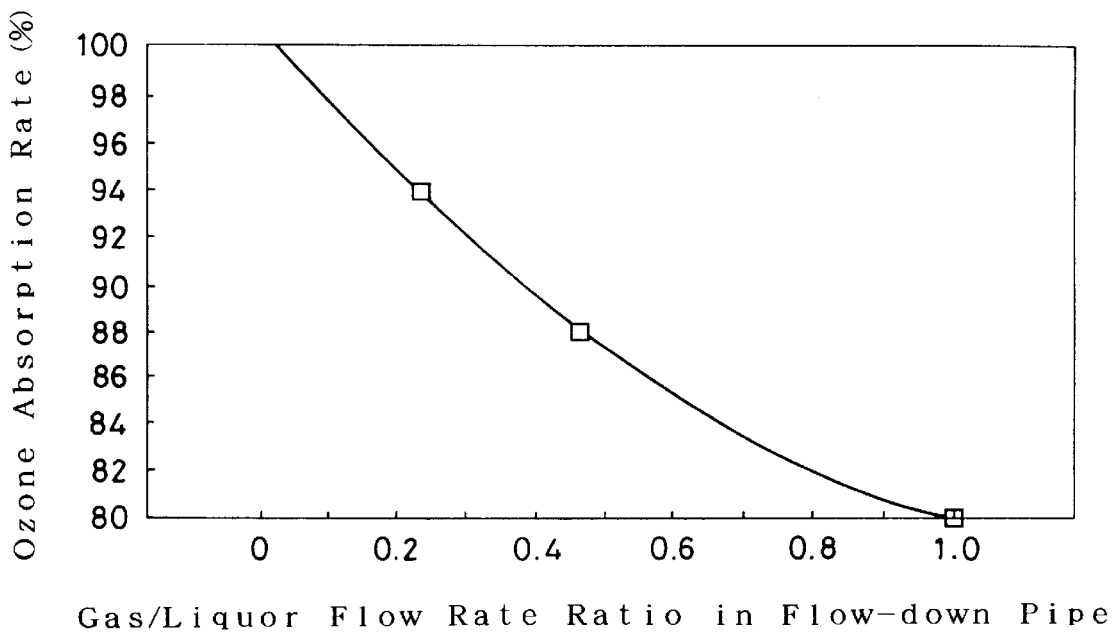
FIG. 3 is a graph showing the relationship between the proportion of gas/liquor flow rates in the flow-down pipe and the ozone absorption rate in the Example.

The variation in the ozone absorption rate (%) due to alteration of the gas/liquid flow rate ratio (G/L ratio) in the flow-down pipe at a space velocity (SV) of the gas of 4 hr$^{-1}$ is shown in FIG. 3. Also, the variation in the ozone absorption rate (%) due to alteration of the LV of the gas in the flow-down pipe at a gas SV in the ozone treating vessel of 4 hr$^{-1}$, a G/L ratio in the flow-down pipe of 0.23 and an LV of the circulating liquor of 60 m$^3$/hr is shown in FIG. 4.

Figure 4:
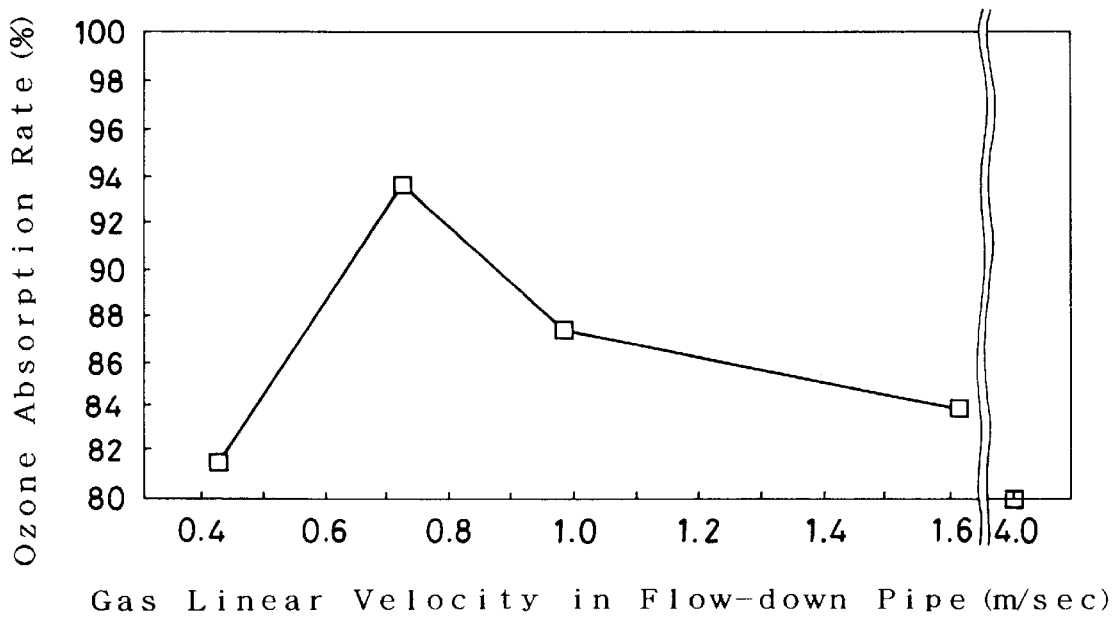
FIG. 4 is a graph showing the relationship between the gas linear velocity in the flow-down pipe and the ozone absorption rate in the Example.

From FIGS. 3 and 4, it is seen that a G/L ratio in the flow-down pipe of 0.1–1 and a gas LV in the flow-down pipe of 0.4–4 m/sec are favorable.

COMPARATIVE EXAMPLE 1

An ozone treatment was carried out in the apparatus of Example 1 in such a manner that the flow-down pipe 14 and the circulation line 18 were not used and the ozone-containing gas was dispersed in the ozone-treating vessel 3 using a porous gas diffusing device at an SV of 4 hr$^{-1}$, whereby an ozone absorption rate of 88% was attained. The gas diffusing device began to clog after 14 days and the absorption rate was decreased to 70%.

EXAMPLE 2

A sewage waste discharge rate of 40 m$^3$/day with a BOD of 190 mg/l was aerobically treated. The aeration tank 1 had a capacity of 10 m$^3$, in which the treatment was carried out at an MLSS of 2,000 mg/l. As the ozone-treating vessel 3, one having three treating chambers 3a, 3b and 3c, each having a diameter of 170 mm, a height of 2,000 mm and an effective volume of 15 liters, connected in series was employed. A biosludge slurry having a concentration of 4,000 mg/l was supplied at a rate of 400 liters per hour with its pH being adjusted to 3 by sulfuric acid. To this, an ozone-containing gas of a concentration of 50 g/m$^3$ was introduced at a flow rate of 480 liters per hour using an ejector. The gas was supplied to each of the flow-down pipes 14a, 14b and 14c in such a condition that a G/L ratio in a non-compressed state of 1.2, a gas LV in a non-compressed state of 1.7 m/sec, so as to settle the first stage pressure at 1.5 kgf/cm$^2$ gauge, the second stage pressure at 1.0 kgf/cm$^2$ gauge and the third stage pressure at 0.5 kgf/cm$^2$ gauge, in order to effect the ozone treatment. The over-all gas SV in the entire vessel was 10.6 hr$^{-1}$ (32 hr$^{-1}$ in each chamber) and the ozone dose was 0.015 g O$_3$/g VSS. As a result, the actual G/L was observed to be 0.48 for the first stage, 0.6 for the second stage and 0.8 for the third stage. The ozone absorption rate was found to be 65% at the first stage exit, 80% at the second stage exit and 92% at the third stage exit. No clogging of the ozone-treating vessel 3 was observed.

EXAMPLE 3

The ozone treatment was carried out as in Example 2 except that the ozone-containing gas was introduced compressedly by a booster pump. The pressure was 10 kgf/cm$^2$ gauge in the first stage, 9.2 kgf/cm$^2$ gauge in the second stage and 8.5 kgf/cm$^2$ gauge in the third stage. The actual G/L ratio was observed to be 0.11 for the first stage, 0.12 for the second stage and 0.13 for the third stage, whereby the ozone absorption rate was found to be 97% at the first stage exit, 99% at the second stage exit and 99.5% at the third stage exit.

COMPARATIVE EXAMPLE 2

In a vessel of the same volume as the treating chamber 3a used in Example 2, the ozone-containing gas used in Example 2 was introduced using a porous gas diffusing device so as to reach a gas SV of 10.6 hr$^{-1}$, whereby an ozone absorption rate of 75% was obtained. After 21 days, the gas diffusing device was clogged and became unusable.

From the above results, it is seen that ozone treatment can be realized at a high ozone absorption rate without suffering from clogging by the sludge, by carrying out the ozone treatment using a flow-down pipe, that the absorption rate becomes higher by designing the ozone treatment vessel in a multistage structure and that the ozone absorption efficiency is increased by pressurization.

INDUSTRIAL APPLICABILITY

The process and the apparatus for biological treatment of aqueous organic wastes according to the present invention can be utilized for a process and an apparatus capable of reducing the excess sludge in the fields of treating aqueous organic wastes, such as sewage waste, excrement, waste water from a food production factory and so on.

What is claimed is:

1. A process for aerobically treating an aqueous organic waste in an aeration tank in the presence of a biosludge containing aerobic microorganisms, comprising the steps of:
   subjecting the aqueous organic waste in the aeration tank to an aerobic biological treatment in the presence of an activated biosludge containing aerobic microorganisms to generate a mixed liquor containing the activated biosludge and the aqueous organic waste;
   subjecting the mixed liquor to solid/liquid separation to form a treated separated liquid phase and a separated biosludge;

forming a biosludge-containing liquor from a part of either mixed liquor withdrawn from the aeration tank or the separated biosludge;

treating the biosludge-containing liquor in an ozone-treatment vessel with ozone by injecting an ozone-containing gas into the biosludge-containing liquor at a rate of 0.002–0.05 gram ozone per gram VSS to form a foam layer and a liquor containing the ozonized biosludge; and supplying a liquor containing the ozonized biosludge to the aeration tank, wherein a mixed flow of the ozone-containing gas and one of biosludge-containing liquor to be treated and ozonized biosludge-containing liquor is passed in a downward flow through a pipe at a gas/liquor flow rate ratio in the range of 0.1 to 1 and a gas linear velocity of 0.4–4 m/sec and introduced into the ozone-treatment vessel in such a state that the ozone-containing gas is dispersed as finely disintegrated bubbles within the biosludge-containing liquor so that the biosludge-containing liquor contacts with the ozone-containing gas.

2. A process according to claim 1, wherein the ozone treatment step is realized at a pH of 5 or lower.

3. A process according to claim 1, wherein the ozone treatment is realized under a pressure from normal pressure to 10 kgf/cm$^2$ gauge.

4. A process according to claim 1, wherein the ozone treatment is effected while maintaining the foam layer at a height of at least 1 m above a liquid layer of a depth of 0.2–3 m in the ozone-treatment vessel by spraying the biosludge-containing liquor over the foam layer to suppress the growth thereof.

5. An apparatus for the biological treatment of an aqueous organic waste, comprising:

an aeration tank for performing aerobic treatment of an aqueous organic waste in the presence of a biosludge containing microorganisms and forming a mixed liquor containing the biosludge and the aqueous organic waste, said aeration tank having the aqueous organic waste and the biosludge contained therein;

a solid/liquid separation means for performing solid/liquid separation on the mixed liquor to form a treated separated liquid phase and a separated biosludge;

an ozone-treatment vessel for treating a biosludge-containing liquor formed from a part of either mixed liquor withdrawn from the aeration tank or the separated biosludge by contacting the biosludge-containing liquor with an ozone-containing gas at an ozone injection rate of 0.002–0.05 gram ozone per gram VSS to form a foam layer and effect an ozone treatment; and a supply line for supplying a liquor containing the ozonized sludge from the ozone-treating vessel to the aeration tank, wherein the ozone-treating vessel comprises flow-down pipe means for passing a mixed flow of the ozone-containing gas and one of biosludge-containing liquor to be treated and ozonized biosludge-containing liquor in a downward flow at a gas/liquor flow rate ratio in the range of 0.1 to 1 and a gas linear velocity of 0.4–4 m/sec into the ozone-treatment vessel in such a state that the ozone-containing gas is dispersed as finely disintegrated bubbles within the biosludge-containing liquor so that the biosludge-containing liquor contacts with the ozone-containing gas.

6. An apparatus according to claim 5, wherein the ozone-treating vessel is provided with a circulation path for circulating the ozonized biosludge-containing liquor in the ozone-treating vessel to the flow-down pipe and with an introduction path for introducing the ozone-containing gas into the circulation path.

7. An apparatus according to claim 5, wherein the ozone-treating vessel comprises a plurality of multistaged treatment chambers each provided with a flow-down pipe and a transfer path for transferring the mixedflow of the ozonized biosludge-containing liquor and of the ozone-containing gas from the treatment chamber of the preceding stage to the flow-down pipe of the treatment chamber of the subsequent stage.

8. An apparatus according to claim 5, wherein the ozone-treatment vessel comprises a spray means for spraying the biosludge-containing liquor over the foam layer which has a height of at least 1 m above a liquid layer having a depth of 0.2–3 m.

* * * * *